United States Patent [19]

Womack

[11] Patent Number: 5,589,076

[45] Date of Patent: Dec. 31, 1996

[54] METHOD AND APPARATUS FOR OPTIMIZING OPERATION OF A FILTER SYSTEM

[75] Inventor: Thomas H. Womack, Novato, Calif.

[73] Assignee: Womack International, Inc., Novato, Calif.

[21] Appl. No.: 585,144

[22] Filed: Jan. 11, 1996

Related U.S. Application Data

[63] Continuation of Ser. No. 240,856, May 10, 1994, abandoned.

[51] Int. Cl.$^6$ .............................. B01D 17/12; B01D 33/70
[52] U.S. Cl. .............................. 210/739; 210/93; 210/137; 210/168; 210/193; 210/387; 210/416.5; 210/767
[58] Field of Search .................................. 72/41, 43–45; 210/86, 87, 93, 101, 103, 104, 110, 137, 143, 168, 193, 198.1, 257.1, 258, 739, 744, 767, 808, 94, 96.1, 97, 387, 400, 416.1, 416.5; 55/270, 274

[56] References Cited

U.S. PATENT DOCUMENTS

| | | | |
|---|---|---|---|
| 2,303,261 | 11/1942 | Dunmire | 210/168 |
| 2,971,648 | 2/1961 | Lane et al. | 210/193 |
| 3,247,106 | 4/1966 | Sopoci | 210/778 |
| 3,618,766 | 11/1971 | Morey | 210/778 |
| 3,837,199 | 9/1974 | Larsonneur | 72/45 |
| 4,618,431 | 10/1986 | Hindman et al. | 210/110 |
| 5,236,601 | 8/1993 | Snell et al. | 210/778 |

OTHER PUBLICATIONS

"Computer Control System for Water and Wastewater Treatment Plants", Kashiwagi et al., Hitachi Review, vol. 27 (Apr. 1978) No. 3.

"Control of the Surface-Water Purification Plant for the Amsterdam Water-Supply Authority", Klinde, Philips Technical Review, vol. 36, No. 10 (1975).

*Primary Examiner*—Joseph W. Drodge
*Attorney, Agent, or Firm*—Robert Charles Hill

[57] ABSTRACT

A method and apparatus for optimizing operation of a filter system supplying filtered fluid to a process system characterized by varying demands for filtered fluid, a pump being operable at a varying flow rate for supplying inlet fluid to the filter system and developing a supply of outlet filtered fluid for the process system, a selected parameter of the process system indicative of its demands for filtered fluid being sensed in order to generate representative feedback data and regulating operation of the filter system pump to supply inlet fluid to the filter system at a rate determined by the feedback data whereby the filter system operates at a variable rate in proportion to the varying demands of the process system. Operation of the filter system pump is preferably regulated by adjusting either its operating speed or volumetric stroke. Parameters for the processing system include either the fluid level in a holding tank between the filtering system and the processing system or another condition of the process system. The introduction by bodyfeed systems of one or more filter aids to a filter element in the filter system is also regulated according to different variable conditions for optimizing filter system operation.

48 Claims, 2 Drawing Sheets

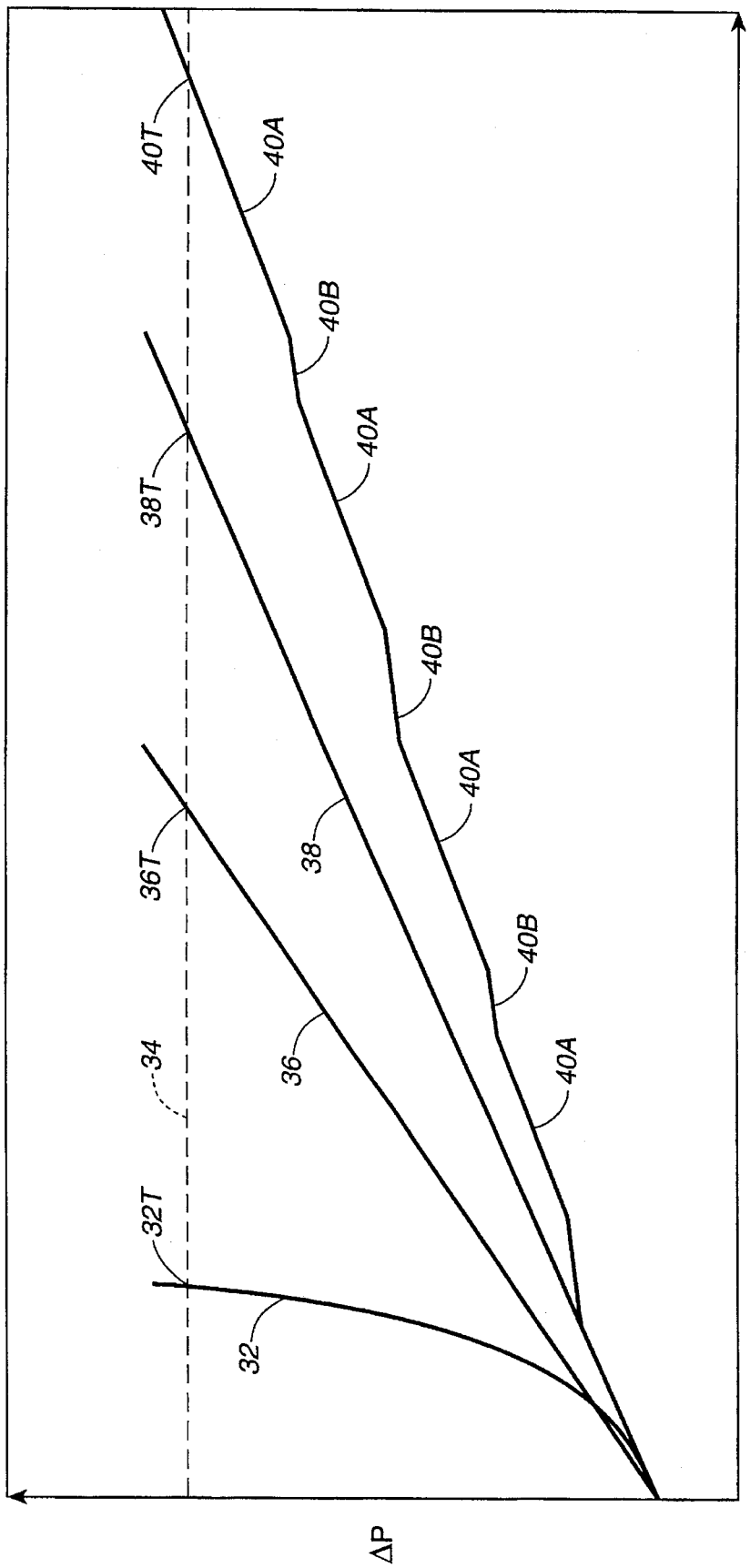
FIG._1

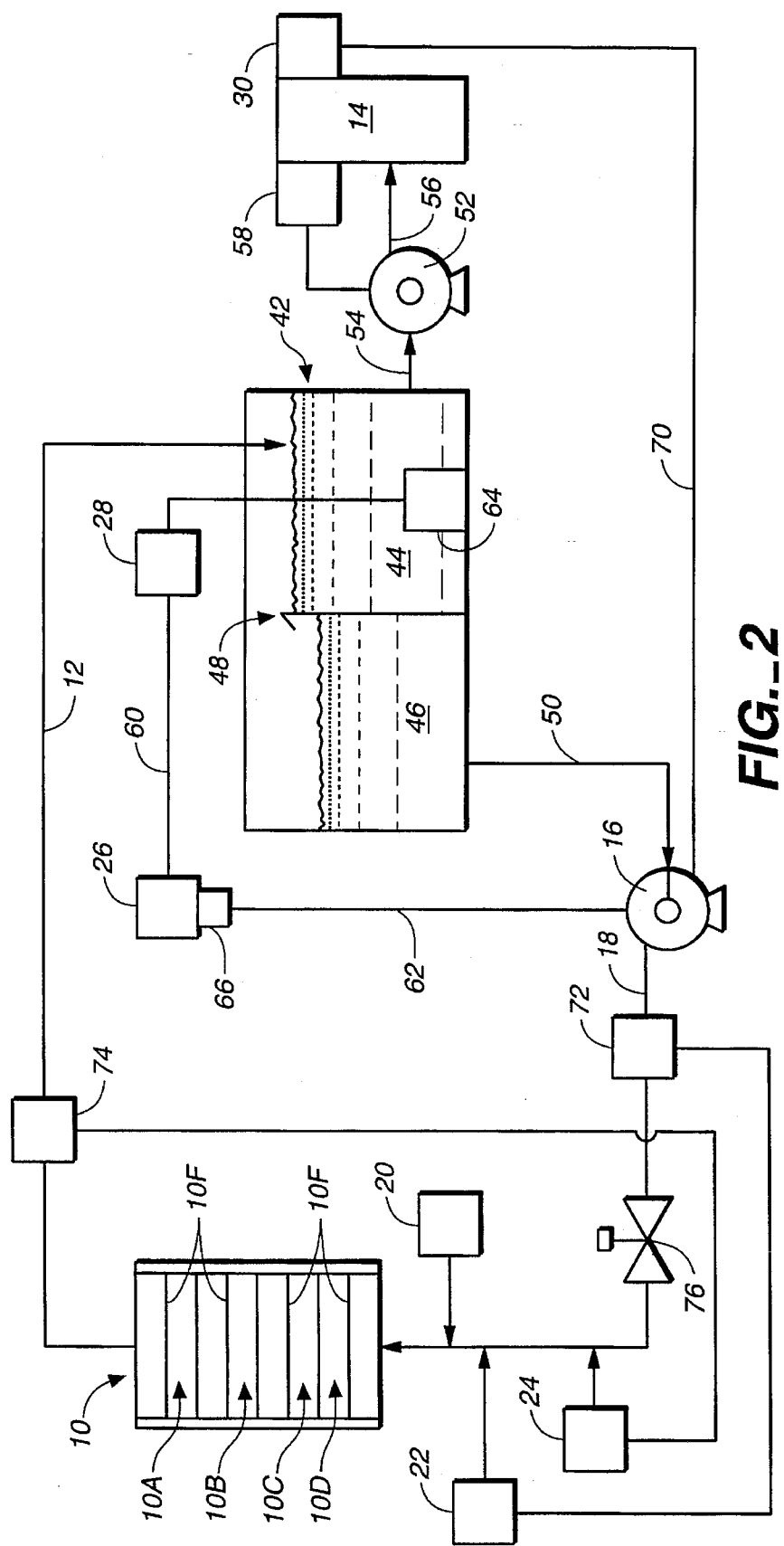
FIG._2

METHOD AND APPARATUS FOR OPTIMIZING OPERATION OF A FILTER SYSTEM

This is a continuation of application 08-240,856 filed on May 10, 1994, now abandoned.

FIELD OF THE INVENTION

The present invention relates to a method and apparatus for optimizing operation of a filter system and more particularly for optimizing operation of a pressure filter system supplying filtered fluid to a process characterized by varying demands for filtered fluid.

BACKGROUND OF THE INVENTION

As indicated above, the present invention is particularly directed toward pressure filter systems and more preferably toward such a pressure filter system employed for supplying filtered fluid to a process or system characterized by varying demands for filtered fluid.

Process systems of the type referred to above include, for example, metalworking processes such as two-piece D&I can manufacturing and rolling mills for aluminum or other metals where a coolant/lubricant is used in the metalworking process and then is reconditioned in a filter system to remove undesirable contaminants and to permit recycling of the fluid for continued use in the process.

Other process systems of the type referred to above include chemical processes such as ink and paint manufacturing, electroplating and metal surface treating processes, etc., automotive applications, waste water treatment and food and beverage processing. Numerous other examples of processing systems contemplated by the present invention will also be obvious from the typical processes described above.

Pressure filters employed in connection with such process systems typically utilize a porous membrane or filter media through which the fluid is forced under pressure in order to remove particulate materials or contaminants, and thus to recondition the fluid for reuse in processes such as those described above.

The porous filter media is commonly supplied in rolls so that it can readily be replaced within the filter assembly or chamber. A portion of the filter media which has received a substantial accumulation or build-up of contaminants tending to produce a processing limiting pressure drop across the filter media is simultaneously removed from the filter assembly for disposal.

A basic filtering method of the type described above is commonly referred to as pad filtration and may employ a porous filter media by itself for removing contaminants from fluid passing therethrough. Such applications typically employ a filter media of a type adapted for either surface, or surface and depth filtration. Pad filtration of this type is satisfactory particularly if it results in the efficiency of filtration required by the application, and in relatively long filter cycles without an excessive requirement for replacement of the spent filter media.

For application where unique problems must be dealt with or extremely efficiency filtration must be achieved, filter aids are commonly used. Filter aid materials of the type described below are precoated onto the filter media for increased efficiency, and/or unique capability. Such filter aid material may be deposited onto a porous support media for example to a thickness of about 1/16 inch for this purpose.

The capacity of a filter media, particularly in terms of its operating duration prior to the need for replacing the filter media, may be further increased by both precoating and bodyfeeding filter aid materials onto the surface of the support media. In such applications, filter aid materials are initially deposited or precoated onto the filter media as described above with additional filter aid material being included or bodyfed with the fluid to be filtered. In this manner, the filter aid materials supplied by bodyfeeding operations tend to continuously deposit upon the filter media during each filter operating cycle, and thereby continuously renew the surface of the filter media as described in greater detail below in order to again improve capacity by still further extending the operating cycle life for the filter media.

Thus, pressure filter systems of the type referred to above frequently employ various filter aids in order to improve both efficiency and capacity of the filter. Typical filter aid materials include, for example, diatomaceous earth, cellulosic materials, burned rice hulls, Fuller's Earth, Bentonite, Attapulgite, Perlite, etc. Additional filter aid materials are also described and listed below. Generally, these filter aids may be precoated onto the filter media, or precoated and continuously bodyfed to the filter media during filtration, for example in a precoat and bodyfeed operation as described in greater detail below.

Filter aids are generally applied to the filter initially by precoating the filter elements to establish the initial filter septum. In an effort to prevent the precoated media from quickly blinding across its surface with contaminants, additional filter aid is continuously or intermittently applied to the filter septum in order to continuously renew the filter surface. This process is referred to as bodyfeeding. By bodyfeeding filter aid to the filter septum along with the contaminants to be removed, filtration is accomplished by retention of contaminants throughout the accumulated cake and filter aid materials. In so doing, the pressure drop across the filter develops in a relatively linear relationship with time (assuming flow rates and contaminant loading are constant). Without bodyfeeding, filtration would occur at the surface of the pre-established filter septum and surface blinding would occur causing the pressure drop across the filter to develop in an exponential relationship with time, resulting in significantly shorter filter cycles and reduced filter capacity.

Filter aids of the type referred to above may be selected for simple physical entrapment of particles and typically include generally non-polar materials such as diatomaceous earth and the like. Other systems may employ filter aids which are polar materials such as Fuller's Earth, Bentonite and Attapulgite, etc. These materials are generally referred to as "charged clays". Such polar filter aid materials are particularly desirable for removing extremely small charged particles or "color bodies" from process fluid.

Prior art bodyfeed systems of the type discussed above have been disclosed for example in Pato, U.S. Pat. No. 4,514,306 issued Apr. 30, 1985 under assignment to Monarch Wine Co., Inc., Brooklyn, N.Y.; Strub, U.S. Pat. No. 4,118,778 issued Oct. 3, 1978 under assignment to Filtrox Maschinenbau A. G., St. Gallen, Switzerland; Lane, et al., U.S. Pat No. 2,971,648 issued Feb. 14, 1961 under mesne assignment to Union Tank Car Company, Chicago, Ill.; and in UK Patent Application GB 2 264 882 A, published Sep. 15, 1993 by the Applicant Achenbach Buschhutten GmbH.

SUMMARY OF THE INVENTION

The pressure filter systems referred to above have been found to be generally satisfactory for providing the quality of filtration required in their intended purpose. However, the present invention contemplates an effort to maximize filter efficiency and reduce filter media usage, solid waste generation and operating labor requirements for such systems.

It is accordingly an object of the invention to provide an improved method and apparatus for controlling operation of such filter systems with improvements over the prior art discussed above. More particularly, the present invention contemplates a method and apparatus for optimizing operation of a filter system, more specifically, a pressure filter system employed for supplying filtered fluid to a process system characterized by varying demands for filtered fluid in order to achieve various advantages as described in greater detail below.

Generally, prior art filter systems of the type discussed above are commonly driven by a constant speed centrifugal pump or the like supplying fluid to be filtered to the filter system. Typically, in many of the applications discussed above and contemplated for the present invention, the fluid to be filtered is used in the process supplied by the filter system and recycled to the filter system in order to be reconditioned for continued reuse.

By contrast, it is a more specific object of the invention to optimize hydraulic operation of a filter system by supplying filtered fluid to a process system at a rate responsive to and consistent with varying demands of the process system for the filtered fluid.

It is also a more specific object of the invention to provide such a method and apparatus for optimizing operation of a filter system supplying filtered fluid to a process system characterized by varying demands for filtered fluid wherein the filter system is driven by a supply means operable at a variable flow rate for supplying fluid to be filtered to the filter system at a rate determined by (a) sensing a selected parameter of the process system indicative of its demands for filtered fluid, (b) generating feedback data representative of those varying demands, and then (c) regulating flow to the filter system from the supply means in order to produce outlet fluid at a rate determined by the feedback data, whereby the filter system operates at a variable rate for supplying filtered fluid generally in proportion to the varying demands of the process system.

Control of the filter system may be accomplished with an adjustable outlet valve positioned between the filter system supply means and the filter system itself, or preferably by adjusting the flow rate of a pump comprising the filter system supply means, for example, by varying a pump characteristic including operating speed or volumetric stroke.

It is further preferably contemplated to provide a holding means or tank for receiving filtered fluid from the filtering system and for supplying the filtered fluid to the process system. The selected operating parameter for the process system may then be selected either as a fluid level within the holding means or the rate at which fluid is drawn from the holding means by the process system, for example, by means of a pump supplying fluid from the holding means to the process system.

It is also an object of the present invention to optimize operation of filter systems of a type employing at least a first bodyfeed system supplying a selected first bodyfed filter aid or combination of filter aids from a first bodyfeed source and regulating operation of the first bodyfeed source in response to monitoring of a variable selected from (a) a condition of the contaminated fluid supplied to the filter, (b) a condition of the outlet filtered fluid and/or (c) a condition of the filter element in order to supply the first bodyfed filter aid to the filter element in an amount and at times indicated by the monitored condition of the outlet filtered fluid.

It is a further related object of this invention to provide such a filter system with a second bodyfeed system supplying a second bodyfed filter aid from a second bodyfeed source to the filter element, preferably by means of fluid to be filtered, and monitoring first and second variable conditions respectively indicating requirements for the first and second bodyfed filter aids in accordance with respective demands established by the first and second variable conditions. Preferably, the first and second variable conditions may include turbidity or contaminant particle count of the inlet filter fluid or a pressure drop across a filter element in the filter system as an indication of relatively larger particles capable of removal in the filter system by the first bodyfed filter aid and color of the filtered fluid as an indication of relatively smaller particles or (polar) "color bodies" capable of removal by the second bodyfed filter aid in the filter system.

It is yet a further object of the invention to provide a method and apparatus for optimizing operation of a filter system to supply outlet filtered fluid at a variable rate to a processing system, the filter system being of a type employing at least a first bodyfed filter aid with a first bodyfeed source responsive to a variable condition as summarized above.

It is a further related object of the invention to provide a second bodyfeed source for the filter system and to supply the first and second bodyfed filter aids to the system in accordance with separate variable conditions as also summarized above.

It is an even further object of the invention to then regulate operation of the filter system for supplying filtered fluid to the process system at a rate responsive to varying demands of the process system for filtered fluid.

Additional objects and advantages of the invention are made apparent in the following description having reference to the accompanying drawings.

DESCRIPTION OF THE DRAWINGS

FIG. 1 is a graphical representation of pressure differential or pressure loss within a filter system of the type contemplated by the present invention relative to time for different conditions representing the prior art and optimized operation of a filter system according to the present invention.

FIG. 2 is a schematic illustration of a filter system of a type adapted for operation with a process system, as illustrated, according to the present invention.

DESCRIPTION OF THE PREFERRED EMBODIMENTS

Referring initially to FIG. 2, a filter system, preferably a pressure filter system, is indicated at 10 for supplying filtered fluid through a conduit 12 to a supply reservoir for a process system 14.

The pressure filter system 10 preferably comprises one or more parallel manifold chambers 10A, 10B. 10C, etc. each having a filter element 10F. In a pressure filter system of the type contemplated by the present invention, fluid to be filtered is supplied to the filter system 10, under pressure, by a pump indicated at 16 through a conduit so that a pressure drop is developed across each of the parallel manifold filter elements 10F by fluid flow through the filter elements. The pressure drop across each of the filter elements 10F tends to increase during continued operation of the filter system 10 as described in greater detail below.

The construction of the filter system 10 is not described further since a wide variety of pressure filter systems is contemplated by the present invention. The construction and operation of such pressure filter systems are well known to those skilled in the art and are accordingly believed obvious for purposes of the present invention.

Pressure filters employed in metalworking applications typically utilize a roll stock filter media for selectively removing contaminants from a given stream of process fluid. The requirements of the process determine the efficiency or "tightness" of filter media required. The finer and more efficient the requirements of the process become, the tighter and more efficient the filter media must be to meet performance requirements.

For the filter media to block and retain smaller particles (that is, be more efficient), the openings or restrictions in the filter media must be smaller. Generally, for any given type of filter media, as the efficiency increases, the ratio of open area (open filter channels) to closed area (filter matrix or structure) becomes smaller and the hydraulic pressure drop across the filter media at any given flow rate and contaminant load increases exponentially (that is, by the square).

Thus, at any given flow rate and contaminant load a fine, high efficiency filter media will cause a given filter device to go to "clean-cycle" pressure exponentially faster than a less efficient, more open filter media. The term "clean-cycle" pressure merely refers to a predetermined, process limiting pressure drop across the filter that is established by the filter system operator for replacement or cleaning of the filter media followed by continuation of a new filter operating cycle.

Likewise, as a given filter media becomes plugged with contaminants, the number of open filter channels progressively diminishes. As the effective filter area decreases, the velocity of fluid flow through the remaining open channels increases in a linear fashion, causing the hydraulic pressure drop across the filter to increase by the square in accordance with generally accepted hydraulic principles.

The preceding summary relates to pad type filtration as discussed above and also to filter operations employed with precoat alone to form a more efficient filter septum.

A method frequently used to prevent the exponential effect of surface blinding, as discussed above, is to precoat the filter with a filter aid material such as diatomaceous earth to achieve the quality and efficiency of filtration required for a given process. Instead of allowing that precoat mass of filter media to plug by surface blinding, additional filter aid is continuously applied to the filter to continuously renew the surface of the filter septum. This process is referred to as precoat and bodyfeed filtration. Ideally, the rate at which filter aid is bodyfed to the filter is directly proportional to the rate of introduction of contaminants to the filter. Thus, the hydraulic pressure drop across the filter increases in a linear fashion (as a theoretical matter) in direct proportion to the thickness of the filter cake developed by the precoat and bodyfeed process.

At any given time in any given filtration process, the hydraulic pressure drop across the filter is directly proportional to the velocity of flow of fluid through the filter septum. As the velocity varies through the filter septum, the pressure drop across the filter septum varies by the square. Thus, it becomes obvious that the operating cost of a given filter system utilizing a given filter media, filtering a given process fluid with a given contaminant load is dramatically affected by the flow rate of fluid through the filter. As the volume rate of flow varies, operating costs vary by the square.

Historically, in many process applications, multiple plate pressure filters have been designed and controlled to filter process fluids at a rate of 110 to 120% of maximum process requirements. This practice assures that the clean filtrate reservoir is always provided with an ample volume rate of flow of process fluid to meet 100% of the maximum needs of the manufacturing process plus allowing for the overflow of at least 10% to 20% excess flow rate from the clean fluid reservoir back into the dirty fluid reservoir.

For any given process that always operates at 100% of maximum system requirements, between 10% and 20% excess flow rate through the filter is provided to assure that the process always has a full and reliable inventory of clean filtrate to meet process demands. This results in the following inefficiencies:

1. Exponential excesses in filter media usage. A 10% excess flow rate results in a 19% excess filter media usage. A 20% excess flow rate results in a 36% excess filter media usage;
2. Exponential excesses in solid waste produced that must be disposed of that are consistent with the excesses cited in item 1 above;
3. Excess energy wasted to process excess flow rates;
4. Excess wash through of contaminants that might otherwise be captured within the matrix of the filter septum of a depth filter media. A depth filter media captures significant quantities of very small contaminants that are much smaller than the channels through the filter matrix. Such contaminants become lodged or impacted while passing through the tortuous paths of flow through the filter matrix. As velocity of flow through the filter septum increases, the rate of capture of sub-filterable fines decreases; and
5. Excess filtration rates dictate a larger than actually required filter, thus resulting in excessive capital cost for filtration equipment.

Compounding the above inefficiencies is the fact that many processes do not require constant, uniform process flow rates for all products or all levels of plant operation. In most cases, the process flow rate requirements vary significantly from product to product or mode to mode of operation. For example, in an aluminum rolling process, mill roll coolant requirements vary substantially from one given product to another, and during coil changes and roll changes, no coolant is required at all on the mill.

Additionally, it is significant that different products manufactured within a given process will produce different types and quantities of contaminants. Using the above example of an aluminum rolling mill, the quantity and particle size distribution of metallic fines and oxides produced in the rolling process vary significantly from one alloy to another. The amount of polar contaminants (color bodies) produced likewise varies greatly from one alloy to another.

It is the intention of this invention to describe several methods that can be used to optimize the performance and operating efficiency of the multiple plate pressure filter as described below in greater detail.

The simplest and least expensive method involves the use of a simple float level control system (not shown) to modulate the rate-of-flow control valve 76 in FIG. 2 upstream of filter 10 so as to maintain a constant operating level/volume of clean filtrate in the clean filtered fluid reservoir 44 at all times regardless of the process fluid flow rate requirements. As process supply increases, the clean tank reservoir 44 level drops sufficiently to drop a float ball which opens the float valve allowing control air pressure on the rate-of-flow control valve 74 to drop. As the control air pressure reduces, the rate-of-flow control valve 74 opens wider allowing a higher rate of flow of fluid to pass through the valve to filter 10 and ultimately causes the operating level in the clean fluid reservoir 44 to rise back to normal control level. Conversely if the process requires less from the clean fluid system 44, the float ball in the clean fluid reservoir 44 will rise slightly. The rising float ball closes the float valve slightly, causing control air pressure to increase on the rate-of-flow control valve 76, causing the valve to modulate in a more closed position, thus reducing the flow rate of fluid through filter 10, and causing the level in the clean filtrate tank 44 to drop slightly until normal control level in the reservoir is re-established.

By controlling the filter to meet absolute process requirements rather than 110% to 120% of maximum worst case requirements, the system operates more efficiently. Reduced flow rates through the filter provide for:

1. Reduced hydraulic pressure losses across the filter septum. The result is exponentially longer filter operating cycles which reduces filter media usage, solid waste generation from the process and operating labor to attend the filter;
2. Reduced pump power consumption thus making the system more energy efficient; and
3. Reduced fluid velocities through the filter septum thus improving retention of sub-filterable fines in a depth filter septum resulting in improved filtration efficiency.

All the above improvements can also be accomplished more efficiently through the use of variable, positive displacement pumps or variable frequency control devices (VFD's) on the drive motors for the centrifugal filter supply and process supply pumps with significant further improvements in energy efficiency, also as described in greater detail below.

By monitoring process flow rate directly through the use of flow meters, or by monitoring clean reservoir operating level, the appropriate control signals can be used to control a variable positive displacement pump to vary pump output to match absolute system demands. Thus, as pump displacement is reduced to meet the absolute requirements of the system at any point in time, the energy requirements to drive the pump are reduced.

Again, by monitoring process flow rate directly through the use of the flow meters, or by monitoring the clean reservoir operating level, the appropriate control signals can be used to control a variable frequency control device which will vary pump drive motor speed to meet the absolute needs of the system. Horsepower requirements to drive any given centrifugal pump will vary directly with pump speed. Thus, as pump speed is reduced to meet the actual requirements of a given system at any point in time, the energy requirements to drive the pump are reduced.

A pressure filter system, as outlined above, is described in greater detail below, specifically in combination with a process system 14 also described below.

The process system 14, as also noted above, may be preferably characterized by varying demands for filtered fluid and may include a variety of applications such as metalworking, particularly rolling mills for various metals such as aluminum, etc., chemical processes including metal surface treating, i.e., chrome and phosphate conversion coatings, the manufacture of inks and paints, etc., automotive applications including manufacture of automotive parts, etc. and food and beverage processes.

Frequently for such applications, the filter system 10 in FIG. 2 is preferably adapted for use with a precoat system supplying precoated filter aid consisting of materials well known to those skilled in the filter art, the precoated filter aid being supplied by a precoat source 20 preferably interconnected with the inlet conduit 18 interconnecting the pump 16 with the filter assembly 10. It may also be connected to the pump suction pipe 50. In addition, the filter system 10 is preferably provided with first and second bodyfeed sources 22 and 24 also preferably interconnected with the inlet conduit 18 for supplying first and second bodyfed filter aids to the filter system 10. They also may be interconnected with the suction pipe 50 for the pump 16.

It is specifically contemplated that the precoat source 20 be operable in a generally conventional manner for supplying a substantial amount of precoated filter aid material to coat the filter elements 10F at the beginning of a filter cycle. By contrast, the first and second bodyfeed sources 22 and 24 introduce the first and second bodyfed filter aids into the fluid to be filtered upstream of the filter system 10. Thus, the first and second bodyfed filter aids tend to deposit upon the cake (not otherwise shown) on the respective filter elements 10F during operation of the filter system. The precoat source 20 supplies a porous/depth type filter aid material and could also be used as one of the body feed sources wherein the bodyfeed material is identical to the precoat material. Also, it has been common practice in the prior art to blend both precoat and bodyfeed filter aid material in one common feed system such as source 20 and distributed to the filter as appropriate to complete both the precoat cycle and a continuous bodyfeed operation. However, separate body feed sources 22 and 24 are described for the present invention for purposes of simplicity. Furthermore, where the second body fed filter aid is a charged clay, that material by itself tends to blind off the filter surface and accordingly is supplied to the filter system generally in combination with porous/depth type filter aid material either from the first body feed source or combined with the charged clay in the source 24.

Based on the initial portions of the filter system and process system described above with reference to FIG. 2, reference is also made to FIG. 1 in order to summarize important operating characteristics of the present invention. Initially, operation of the filter system 10 is effectively controlled by the pump 16 which is preferably of a type adapted for varying the flow rate of fluid to be filtered through the inlet conduit 18 under the regulation of a control unit 26. The unit 26 is responsive to feedback data supplied by a monitoring means 28, described in greater detail below, for monitoring a selected condition or parameter representative of varying filtered fluid demands of the process system 14.

Initially, the present invention contemplates optimizing hydraulic operation of the filter system 10 by regulating its operation through the pump 16 so that filtered fluid is delivered to the process supply reservoir 44 through the outlet conduit 12 at a rate generally proportional to fluid demands of the process system 14.

Advantages from optimizing hydraulic filter operation in this manner are particularly apparent from a consideration of solid waste materials to be intermittently disposed of from the filter system. In that regard, frequently less than about 1%, for example, of the solids collected in such a filtration process are formed by particles or contaminants produced by the process. The remainder of the solids requiring intermittent disposal from the filter system include filter media forming the filter elements 10F together with filter aid, forming a cake on the filter elements.

Because of the optimized hydraulic operation of the filter system as described herein, it is possible to operate the filter system 10 for substantially longer periods of time before it is necessary to replace the filter elements 10F and to dispose of the cake deposited thereon. Accordingly, substantial savings are realized from optimization of the filter system in the form of:

(a) a reduced requirement for filter media;

(b) reduced labor (for replacement of the spent filter media and other solid waste);

(c) increased operating time (or conversely, a reduction of down time for replacing filter media, solid waste, etc.);

(d) reduced power or energy for operating the filter system 10 (for example by the pump 16); and (e) possibly of greatest significance, a substantial reduction in the amount of solid waste disposal (frequently considered to be hazardous waste) because of the reduction of filter media and filter aids as noted above.

The reduction in solid waste disposal is indicated to be particularly important because such waste materials are commonly disposed of as landfill or in hazardous waste disposal sites, and are often considered an environmental problem because of the contaminants contained therein. Accordingly, it is particularly significant to note that, by practicing the present invention, the amount of solid waste disposal may be reduced, for example, by one half or two thirds or possibly even more.

In addition to optimization of hydraulic operation of the filter system 10, further enhancement of savings of the type outlined above are achieved by regulating operation of the first bodyfeed source 22 and/or second bodyfeed source 24, preferably in response to (a) varying conditions of the fluid to be filtered in the filter system 10, (b) outlet filtered fluid from the filter system 10 and/or (c) conditions within the filter system 10 itself. Operation of the first and second bodyfeed sources 22 and 24 in this regard is described in greater detail below.

At the same time, operation of the filter system 10 is even further enhanced by a control unit 30, also described in greater detail below. Basically, the control unit 30 is adapted to sense interruptions in variable demands of fluid for the process system 14 and to thereupon reduce operation of the pump 16 to a minimum level for further optimizing operation of the filter system 10. The minimum level of operation contemplated for the pump 16 could include the pump being completely shut down. However, it is preferably contemplated that the minimum level of operation may be approximately 10–30% of normal fluid requirements of the process system 14.

Based on the preceding summary of the invention, and continuing with reference to FIG. 1, the simple use of precoated filter aid material from the source 20, without more, will tend to develop a pressure differential across the filter elements 10F, over time, as indicated by the exponential buildup of pressure versus time as illustrated by curve or plot 32. This is also typical of performance experienced with the use of preformed pad type filter media. If the horizontal line 34 is taken as a selected replacement level for filter media, solids, etc. in the filter system 10, then use of a pad type filter media or a precoated filter aid alone will result in relatively frequent replacement requirements and considerable expense, referring again to the savings discussed above.

By contrast, it has been common practice in the prior art to also supply contaminated fluid and bodyfed filter aid to a pressure filter system such as that indicated at 10 at a fixed rate, for example, about 110% of maximum requirements for filtered fluid in the process system 14. Continuing with reference to FIG. 1, the use of such constant bodyfed filter aid in addition to the precoated filter aid described above tends to produce a relatively straight curve 36 intercepting the replacement level 34 at a substantially extended time relative to the initial curve 32.

As noted above, hydraulic optimization of the filter system by regulating its operation through the pump 16, to meet substantially 100% of absolute process requirements, initially causes a substantial increase in the amount of time before the replacement level 34 is encountered. This is illustrated by curve or plot 38 in FIG. 1.

In addition to the advantages achieved by regulating the pump 16 as described above, the optimized regulation of the first bodyfeed source 22 and/or the regulation of the second bodyfeed source 24 in response to selected variable characteristics as described in greater detail below results in a further flattening of a plot 40 with more gradually inclined portions 40A and relatively horizontal portions 40B respectively indicating either normal operation of the filter system 10 or interrupted operation of the filter system 10, due to normal process downtime intervals. All of the plots in FIG. 1 are generally idealized in that pressure changes would normally be characterized by substantial spikes as the pressure differential varies over time. However, averaging the spikes would result in idealized curves or plots as indicated. Even though idealized, the plots clearly represent the additional efficiency resulting from various steps in the optimization process.

In view of the advantages available from regulation of the filter system 10 through the pump 16 as described above, it can thus be seen that the optimized operation of the filter system according to the present invention may extend the time before necessary replacement of the filter media and filter aid cake deposited thereon to a time interval possibly two to three times, for example, or even greater than the replacement time where the prior art plots 32 and 36 intersect the replacement level 34. In this regard, the times at which the various plots 32, 36, 38 and 40 intersect the replacement level 34 are indicated respectively at 32T, 36T, 38T and 40T.

Further benefits offered by regulating operation of the filter system 10 through its pump 16 as described above are believed obvious. In addition, the savings indicated by the plots 38 and 40 as well as the extended replacement times 38T and 40T achieved by regulation of the filter pump 16 and more preferably regulation of the filter pump 16 in combination with the first and second bodyfeed sources 22 and 24 may be of particular benefit as illustrated in FIG. 1 for certain applications such as in rolling mills for aluminum or other metals. In other applications, the filter system 10 may operate at a generally constant flow rate but with substantial variations in process contaminants to be controlled or removed within the filter system 10, preferably by variable bodyfeed either in the source 22 or in the combined sources 22 and 24 as described above. As described in greater detail below, it is particularly contemplated that the first and second bodyfed filter aids supplied by the respective sources 22 and 24 be adapted for removing different materials in the filter system as described above. Accordingly, the combined regulation of the two sources 22 and 24 is of particular benefit in greatly extending the replacement time 38T or 40T according to the invention in FIG. 1.

It is believed apparent that in applications such as that noted above, variable bodyfeed regulation according to the present invention even without variable control over operation of the filter system 10 by its pump 16 can provide substantial benefits, particularly in comparison with prior art techniques of supplying bodyfeed at a set level (for example 110% to 120% of maximum demand) as indicated by the plot 36 and replacement time 36T in FIG. 1. However, here again, the further benefits of combined regulation of the bodyfeed system and operation of the filter system 10 by the pump 16 are believed apparent for many applications.

The preceding description refers to a rolling mill for aluminum or other metals as a typical application including variable bodyfeeding of filter aid without varying hydraulic filter operation, for example, by the variable pump 16. By contrast, it is noted that a two-piece D&I can manufacturing facility is a typical example of an application where variable and/or intermittent operation of the filter system is particularly desirable, with or without regulation of bodyfed filter aid.

Referring again to FIG. 2, the components of the filter system 10 and process system 14 are described in greater detail below.

Although filtered fluid could be supplied directly from the filter system 10 through the conduit 12 to the process system 14, a holding tank 42 preferably receives filtered fluid from the filter system 10 through the conduit 12 in a filtered (clean) fluid chamber 44. Another chamber 46 in the holding tank 42 contains (dirty) fluid from the process for the filter system. An overflow 48 allows excess filtered fluid from the filtered fluid chamber 44 to overflow into the unfiltered fluid chamber 46 when the chamber 44 is full. Another conduit 50 supplies unfiltered fluid from the chamber 46 to the pump 16 for supply to the filter system 10 as described above.

An additional pump 52 draws filtered fluid from the chamber 44 through a conduit 54 and supplies the filtered fluid to the process system 14 upon demand, as described in greater detail below, through another conduit 56.

The pump 52 may respond to the variable fluid demands of the process system 14 in a variety of ways. However, the process system 14 preferably is provided with a control unit 58 which is responsive to one or more conditions in the process system to indicate its fluid demands. The control unit 58 is also connected with the pump 52 to regulate its operation for supplying filtered fluid to the process system 14 upon demand. Feedback or compensation could also be used between the control unit 58 and the pump 52 in order to achieve more uniform regulation of the pump 52 and, in effect, avoiding any spikes in process supply conditions and data processed by the control unit 58. With the process system 14 being a metalworking system for example, the control unit 58 may be a pressure responsive regulator or the like indicating demands of the process system 14 for coolant/lubricant to be supplied from the filter system 10. Other control parameters may include process temperature or flow rate requirements.

With the arrangement described above, it is thus apparent that varying fluid demands of the process system 14 can be monitored either through (a) the control unit 58 itself which directly senses those varying demands, (b) operation of the pump 52 to supply fluid from the filter system 10 and filtered fluid chamber 44 to the process system 14, (c) the flow rate of filtered fluid to the process system 14 through either of the conduits 54 and 56, or (d) the level of fluid in the filtered fluid chamber 44. Accordingly, hydraulic regulation of the filter system 10 by means of the pump 16 may be adjusted in response to any of the above components coupled with the process system. Preferably, the control unit 26 for the filter system pump 16 is responsively coupled with the monitoring means 28 by a line 60 and with the pump 16 by another line 62. The monitoring means 28 includes pressure sensitive means 64 arranged in the bottom of the chamber 44 for monitoring the level of filtered fluid in the chamber 44 and for supplying feedback data to operate the pump 16 in accordance with the level of fluid in the chamber 44 or the rate at which the fluid level is dropping in the chamber 44 as an indication of the rate of filtered fluid flow to the process system 14 through the pump 52 and conduits 54 and 56.

It will be apparent, as noted above, that the control unit 26 could also be responsively coupled either to the pump 52 or to one of the conduits 54 and 56 (to monitor the fluid flow rate therein) or even to the control unit 58 in order to regulate operation of the filter system pump 16 in accordance with varying demands for fluid in the process system 14.

Thus, in normal operation, the control unit 26 together with the monitoring means 28 and 64 cause the pump 16 to supply fluid to be filtered to the filter system 10 at a rate for supplying filtered fluid to the chamber 44 through the conduit 12 in order to generally maintain a constant fluid level in the chamber 44. However, in the event of unusual operation of one type or another, excess fluid developed in the chamber 44 may simply overflow at 48 into the chamber 46 for resupply to the filter system 10 through the pump 16.

Preferably, the control unit 26 has an ability for averaging data, for example, a conventional computerized unit, so that it is capable of averaging feedback data from the monitoring means 28 over a selected period of time, for example, about 2–20 minutes, in order to avoid rapid changes in operation of the pump 16 in response to possible spikes developed either in the monitors 28 and 64 or the control unit 26 and also possible rapid variations in the level of fluid in the tank 44. With this averaging capability the control unit 26 tends to assure more uniform operation of the pump 16 and more uniform flow of filtered fluid from the filter system 10 to the chamber 44 in accordance with demands of the process system established over the selected time period.

The control unit 30, as noted above, is interconnected with the process system 14 and with the pump 16 through a line 70. The control unit 30 is also a generally conventional type control for sensing operation of the process system at least above a minimum operating level or flow rate. The control unit 30 functions to permit operation of the pump 16 in response to the other control unit 26 when the process system 14 is operating above its minimum level. However, if the process system 14 stops or drops below its minimum operating level, at least for a substantial time period, the control unit 30 functions to either interrupt or preferably to reduce operation of the pump 16 to a minimum level selected merely to maintain some minimum positive flow of fluid through the filter assembly 10 at all times. Otherwise, the minimum level may be selected in order to further optimize operation of the filter assembly 10 so that it is either not operating or operating only at a minimum level when the process system 14 is shut down.

Here again, the control unit 30 could also include averaging means such as that indicated at 66 in order to provide a delay period for its operation. Otherwise, as noted above, the control unit 30 is adapted to further optimize hydraulic operation of the filter system 10 as indicated for example by the plot 40 in FIG. 1.

As noted above, the first and second bodyfeed sources 22 and 24 are adapted for respectively providing first and second body fed filter aids to the filter assembly 10 as required by the specific inlet or outlet fluid conditions or hydraulic conditions across filter elements 10F as noted above. In this regard, the first bodyfed filter aid supplied from the source 22 is preferably of a porous/depth type such as diatomaceous earth for physically filtering relatively large particles (possibly 0.1 microns and larger) from fluid passing through the filter assembly 10. At the same time, the second bodyfeed source 24 supplies a different type of bodyfed filter aid, preferably a polar filter aid or a "charged clay" such as Fuller's Earth, Bentonite or Attapulgite. As noted above, such polar materials are particularly adaptable for removing relatively small particles such as "color bodies" which are often not capable of simple physical filtration but can be removed, for example, by attraction to the polar filter aids noted above. Here again, the very small color bodies may be less than about 0.1 microns in size and further tend to provide a characterizing "color" in fluids from which they are to be removed.

In order to assure delivery of the first and second bodyfed filter aids at times and in amounts for further optimizing operation of the filter system 10, operation of the sources 22 and/or 24 are preferably regulated in response to selected conditions either in the filter assembly 10, in the filtered fluid flowing from the filter assembly, for example, in the clean or filtered fluid chamber 44, or even in the fluid to be filtered, for example, in the other chamber 46.

The first bodyfeed source 22 supplying the first bodyfed filter aid capable of filtering relatively larger particles on a physical basis, is preferably responsive to a turbidity or particle count monitor 72 in the chamber 46 or the filter inlet supply conduit 18. The turbidity monitor 72 may be of a photometric type capable of monitoring different levels of turbidity or with the ability to count particles of contaminants of various size ranges.

Similarly, the second bodyfeed source 24, which supplies a second bodyfed filter aid capable of removing small particles such as "color bodies" from the fluid, is responsive to another monitor 74 in the filter outlet conduit 12 and capable of monitoring color of the filtered fluid as an indication of the presence of the smaller color bodies. The color monitor 74 may also be of a photometric type suitable for its intended operation and generally commercially available for that purpose.

As was also noted above, the body feed sources 22 and 24 could also be responsive to other conditions, for example, in the fluid to be filtered in the chamber 46, possibly by monitors similar to those described at 72 and 74, or conditions within the filter assembly 10. In that regard, at least the first body feed source 22 could be responsive to a monitor (not shown) for monitoring the pressure drop across the filter elements 10F within the filter assembly. The pressure drop across the filter elements 10F also would provide an indication of particulate solids being removed from the filtered fluid flowing to the chamber 44 and thus could provide generally the same function as the turbidity monitor 72.

As noted above, the control unit 26 continuously senses varying demands for filtered fluid from the process system 14, preferably based upon the level of filtered fluid in the chamber 44. As was also noted above, the control unit 26 may be responsive to other parameters or conditions indicating varying fluid demand in the process system 14 such as the control unit 58 itself, the operating rate of the pump 52 or the flow rate of fluid through the conduits 54 and 56.

Preferably, the pump 16 is of an electrically operated type capable of producing varying fluid flow to the filter system 10.

Particularly for a pump of this type, the control unit 26 is preferably connected with a conventional variable frequency device responding to the feedback data received from the monitor 28 and averaged by the control unit 26 for varying the effective operating rate of the pump 16.

The device 66 could also be a different type of component for adjusting the inlet flow rate to the filter system 10. For example, the device 66 could be either a portion of the pump 16 itself or an adjunct thereto while varying the effective stroke of the pump 16. In such a case, the pump 16 could operate at a constant speed but the variable stroke would serve to vary effective flow volume to the filter system 10 in a similar manner as for the control unit 26 being a variable frequency device.

Still further, the pump 16 could either be a variable speed or constant speed type as described above, the control unit 26 and/or device 66 alternatively providing control over an outlet variable valve 76 connected to the output of the pump 16 in a conduit supplying fluid to the filter system 10. With such an arrangement, the control unit 26 could function to effectively adjust the valve 76 for regulating the rate of fluid flow to the filter assembly 10. Such an arrangement could have one disadvantage compared to the other control means described herein in that adjustment of the valve 76 would tend to result in varying back pressure on the pump 16. Thus continued operation of the pump 16 when the valve 76 is restricted could result in undesirable effects such as conversion of excess horsepower into heat which would be transferred into the fluid passing to the filter system 10.

It would also be possible to replace the control unit 26 with a variable coupling or transmission (not shown) interconnected between the pump 16 and, for example, an electric motor (also not shown) for driving the pump 16. In such an arrangement, the motor would operate at generally constant speed with the variable coupling or variable transmission between the motor and pump producing variable output flow from the pump replacing pump 16.

Accordingly, it is obvious that the control unit 26 may take any of a variety of forms to serve its intended function.

There have thus been described above different embodiments of methods and apparatus for optimizing operation of a filter system such as that indicated at 10 in FIG. 2 and capable of supplying filtered fluid to a process such as that indicated at 14 and characterized by varying demands for filtered fluid. In addition, methods and apparatus have also been disclosed for varying one or more sources of bodyfeed to a filter assembly in order to optimize its operation either separately and/or in conjunction with variable operation of the filter system according to the varying demands of the process system for filtered fluid. Numerous variations and modifications have been described above within the scope of the present invention for both the methods and apparatus which are thus believed to be completely described above.

Accordingly, the scope of the present invention is defined only by the following appended claims which are further exemplary of the invention.

What is claimed is:

1. A method for optimizing operation of a pressure filter system comprising at least one readily replacable porous membrane or filter media supplying filtered fluid to a process system characterized by varying demands for filtered fluid, the method comprising the steps of:

controlling the filter system by a supply means for supplying filtered fluid to the process system at a flow rate generally proportional to the varying demands for filtered fluid from the process system;

constantly sensing a selected operating parameter of the process system indicative of its varying demands for filtered fluid and generating feedback data representative of the varying demands for filtered fluid by the process system; and regulating operation of the filter system supply means by a device operable to vary supply of inlet fluid to the filter system at a flow rate determined by the feedback data provided by the selected operating parameter, whereby the filter system operates at a variable flow rate for supplying filtered fluid generally in proportion to the varying demands for filtered fluid by the process system to optimize operation of the filter system.

2. The method of claim 1 wherein the feedback data is selected and generated for operating the filter system supply means in proportional relation to the selected operating parameter of the process system.

3. The method of claim 1 wherein the filter system supply means is a pump regulated by adjusting at least its operating speed or volumetric stroke.

4. The method of claim 1 wherein the selected operating parameter is the rate of flow of filtered fluid demanded by the process system.

5. The method of claim 4 further comprising the steps of supplying filtered fluid from the filter system to a holding means and regulating a flow rate of filtered fluid from the holding means to the process system, the selected operating parameter being the flow rate of filtered fluid from the holding means to the process system.

6. The method of claim 5 wherein the flow rate of filtered fluid from the holding means to the process system is regulated by a process system pumping means responsive to the varying demands of the process system for filtered fluid and further comprising the step of monitoring a characteristic of the process system and generating the feedback data in proportion thereto.

7. The method of claim 5 further comprising the step of monitoring a level of fluid in the holding means as an indication of varying demands of the process system for filtered fluid and generating the feedback data in proportion thereto.

8. The method of claim 5 wherein operation of the filter system pumping means is regulated by adjusting at least its operating speed or volumetric stroke.

9. The method of claim 1 wherein the flow rate of filtered fluid from the holding means to the process system is regulated by a process system pumping means responsive to the varying demands of the process system for filtered fluid and further comprising the step of monitoring a condition of the process system and generating the feedback data in proportion thereto.

10. The method of claim 1 wherein the filter system supply means is an electrically operated pump, said pump regulated by a variable frequency device, said device regulated by the feedback data determined by sensing of the selected operating parameter.

11. The method of claim 1 wherein the filter system supply means includes a variable frequency device for establishing volumetric flow to the filter system, the variable frequency device being regulated by the feedback data determined by sensing of the selected operating parameter.

12. The method of claim 1 further comprising the step of averaging the feedback data over a selected time period to achieve uniform operation of the filter system supply means.

13. The method of claim 1 further comprising reducing operation of the filter system supply means to a minimum level in the absence of substantial demand for filtered fluid from the process system in order to further optimize operation of the process system.

14. The method of claim 1 further adapted for optimizing operation of the filter system, the filter system being of a type having a first bodyfed filter aid supplied from a first bodyfeed source to a filter element in the filter system, and further comprising the steps of:

constantly monitoring at least one first variable condition selected from the group consisting of (a) a condition of inlet fluid for the filter system, (b) a condition of outlet filtered fluid supplied to the process system, and (c) a condition of the filter element; and regulating operation of the first bodyfeed source in response to the monitored condition in order to supply the first bodyfed filter aid to the filter element in an amount and at times indicated by the monitored condition of the outlet filtered fluid.

15. The method of claim 1 wherein the filtered fluid is a filtered coolant/lubricant.

16. The method of claim 15 wherein the process system comprises a mill for rolling various types of metals.

17. A method for optimizing operation of a filter system supplying outlet filtered fluid to a processing system, comprising the steps of:

supplying first and second bodyfed filter aids from first and second bodyfeed sources to a filter element in the filter system;

monitoring at least a first variable condition selected from the group consisting of (a) a condition of inlet fluid for the filter system, (b) a condition of the outlet filtered fluid supplied to the process system, and (c) a condition of the filter element;

regulating operation of the first bodyfeed source in response to the first monitored condition in order to supply the first bodyfed filter aid to the filter system in an mount and at times indicated by the first monitored condition of the filtered fluid;

monitoring at least a second variable condition selected from the group consisting of (a) a condition of inlet fluid for the filter system, (b) a condition of the outlet filtered fluid supplied to the process system, and (c) a condition of the filter element; and regulating operation of the second bodyfeed source in response to the second monitored condition in order to supply the second bodyfed filter aid to the filter system in an amount and at times indicated by the second monitored condition.

18. The method of claim 17 wherein the first condition is turbidity of the filter inlet fluid as an indication of relatively larger particles capable of removal in the filter system by the first bodyfed filter aid and the second condition is color of the filter outlet fluid as an indication of relatively smaller particles or polar "color bodies" capable of removal by the second bodyfed filter aid supplied to the filter system, the first bodyfed filter aid being porous and/or depth filtering type filter aid material and the second bodyfed filter aid being a polar or charged clay particle type.

19. The method of claim 18 wherein the second bodyfed filter aid is always supplied to the filter system in combination with porous/depth type filter aid material in order to prevent or minimize blinding of the filter system.

20. The method of claim 17 further comprising the step of regulating operation of the filter system and supplying filtered fluid to the process system at a rate responsive to varying demands of the process system for filtered fluid.

21. Apparatus constructed and arranged for optimizing operation of a pressure filter system receiving fluid to be filtered from a supply means and supplying filtered fluid to a process system characterized by varying demands for filtered fluid, the apparatus comprising at least one readily replaceable porous membrane or filter media:

control means for variably controlling operation of the supply means and for supplying outlet filtered fluid to the process system at a flow rate generally proportional to the varying demands for filtered fluid by the process system;

means for sensing a selected parameter of the process system indicative of its varying demands for filtered fluid; and means responsive to the sensing means for generating feedback data representative of the selected parameter, the control means being responsive to the generated feedback data for operating the filter system supply means in proportional relation to the selected operating parameter of the process system for supplying inlet fluid to the filter system and to produce filtered outlet fluid at a flow rate determined by the feedback data, whereby the filter system is caused to operate at a variable flow rate for supplying filtered fluid to the process system generally in proportion to the varying demands for filtered fluid by the process system to optimize operation of the filter system.

22. The apparatus of claim 21 wherein the control means for controlling operation of the supply means is responsive to the feedback data for operating the filter system supply means in proportional relation to the selected parameter of the process system.

23. The apparatus of claim 21 wherein the filter system supply means is a pump and the control means regulates operation of the pump by adjusting at least its operating speed or volumetric stroke.

24. The apparatus of claim 21 wherein the sensing means senses the rate of filtered fluid demanded by the process system.

25. The apparatus of claim 21 further comprising a holding means for receiving outlet filtered fluid from the filter system and for delivering filtered fluid to the process system on demand, the further sensing means further sensing a flow rate of filtered fluid from the holding means to the process system.

26. The apparatus of claim 25 further comprising a process system pumping means for transferring filtered fluid from the holding means to the process system in response to the varying demands for filtered fluid of the process system, the sensing means sensing operation of the process system pumping means.

27. The apparatus of claim 25 wherein the sensing means senses a level of fluid in the holding means as an indication of varying demands for filtered fluid of the process system.

28. The apparatus of claim 21 further comprising a holding means for receiving outlet filtered fluid from the filter system and for delivering the filtered fluid to the process system on demand, and a process system pumping means for transferring filtered fluid from the holding means to the process system in response to the varying demands for filtered fluid of the process system, the sensing means sensing a selected condition of the process system.

29. The apparatus of claim 21 wherein the supply means is an electrically operated pump and wherein the control means is a variable frequency device.

30. The apparatus of claim 21 wherein the control means comprises a variable stroke device for determining volumetric flow from the filter system supply means.

31. The apparatus of claim 21 further adapted for optimizing operation of the filter system, the filter system being of a type having a first bodyfed filter aid supplied from a first bodyfeed source to a filter element in the filter system, and further comprising:

first means for monitoring at least one first condition selected from the group consisting of (a) a condition of inlet fluid supplied to the filter system, (b) a condition of outlet filtered fluid supplied to the process system; and (c) a condition of the filter element; and first means for regulating operation of the first bodyfeed source in response to the first monitoring means in order to supply the first bodyfed filter aid to the filter system in an amount and at times indicated by the first monitored condition.

32. The apparatus of claim 21 wherein the generating means comprises means for averaging the feedback data over a selected time period to achieve uniform operation of the filter system supply means.

33. The apparatus of claim 21 further comprising means for reducing operation of the filter system supply means to a minimum level in the absence of substantial demand for filtered fluid from the process system in order to optimize operation of the process system.

34. Apparatus for optimizing operation of a filter system supplying filtered fluid to a process system, the apparatus comprising:

first and second bodyfeed sources for respectively supplying first and second bodyfeed filter aids to the filter system;

first means for monitoring at least one variable selected from the group consisting of (a) a condition of inlet fluid supplied to the filter system, (b) a condition of outlet filtered fluid supplied to the process system, and (c) a condition of a filter element of the filter system;

first means for regulating operation of the first bodyfeed source in response to the first monitoring means in order to supply the first bodyfed filter aid to the filter system in an amount and at times indicated by the first monitored condition;

second means for monitoring at least one variable selected from the group consisting of (a) a condition of inlet fluid supplied to the filter system, (b) a condition of the outlet filtered fluid supplied to the process system, and (c) a condition of the filter element; and second means for regulating operation of the second bodyfeed source in response to the second monitoring means in order to supply the second bodyfed filter aid to the filter element in an amount and at times indicated by the second condition.

35. The apparatus of claim 34 wherein the first monitoring means monitors turbidity or particle count of the filter inlet fluid as an indication of relatively larger particles capable of removal in the filter system by the first bodyfed filter aid and the second monitoring means monitors color of the filter outlet fluid as an indication of relatively smaller particles or polar "color bodies" capable of removal by the second bodyfed filter aid, the second regulating means assuring supply of some porous and/or depth type filter aid material in combination with polar clay forming the second bodyfed filter aid.

36. The apparatus of claim 35 further comprising means for regulating operation of the filter system and supplying filtered fluid to the process system at a rate responsive to varying demands of the process system for filtered fluid.

37. An apparatus for optimizing operation of a filter system, the apparatus comprising:

a filter system comprising at least one readily replaceable porous membrane or filter media;

a process system coupled to the filter system, the process system having varying demands for filtered fluid from the filter system;

pump means adapted to vary the flow of fluid therethrough, the pump means supplying fluid to the filter system at varying flow rates depending upon the varying demands for filtered fluid of the process system for optimizing the operation of the filter system;

fluid holding means interposed between the process system and the filter system, the holding means receiving filtered fluid from the filter system for supplying the fluid to the process system;

monitor means for monitoring the level of filtered fluid in the holding means and for supplying feedback data indicative of the filtered fluid level; and control means coupled to the pump means and to the monitor means, the control means constantly receiving the data from the monitor means for constantly regulating the operation of the pump means to vary the flow rate of fluid supplied to the filter system to optimize the operation of the filter system, such that the filter system supplies filtered fluid to the holding means at a rate generally proportional to the varying demands for filtered fluid of the process system, the control means further inhibiting the pump means from supplying an excessive amount or an insufficient amount of fluid to the filter system.

38. A method for optimizing operation of a pressure filter system supplying filtered fluid to a process system characterized by varying demands for filtered fluid, the method comprising the steps of:

controlling the filter system by a supply means for supplying filtered fluid to the process system at a rate of flow generally proportional to the varying demands for filtered fluid by the process system;

constantly sensing a selected operating parameter of the process system indicative of its varying demands for filtered fluid and generating feedback data representative of the varying demands for filtered fluid by the process system;

regulating operation of the filter system supply means to supply inlet fluid to the filter system at a rate of flow determined by the feedback data, whereby the filter system operates at a variable flow rate supplying filtered fluid generally in proportion to the varying demands for filtered fluid by the process system to optimize operation of the filter system;

supplying a first bodyfed filter aid to a filter element in the filter system by means of a first bodyfeed source;

constantly monitoring at least one first variable condition selected from the group consisting of (a) a condition of inlet fluid to the filter system, (b) a condition of outlet filtered fluid supplied to the process system, and (c) a condition of the filter element;

regulating operation of the first bodyfed source in response to the monitored condition in order to supply the first bodyfed filter aid to the filter element in an amount and at times indicated by at least one first variable condition;

supplying a second bodyfed filter aid to the filter element by means of a second bodyfeed source;

monitoring a second variable condition indicating requirements for the second bodyfed filter aid; and operating the first and second bodyfeed sources in response to the first and second monitored variable conditions for respectively supplying the first and second bodyfed filter aids to the filter element at times and in amounts determined by the first and second variable conditions.

39. The method of claim 38 wherein the first condition is turbidity of the filter inlet fluid as an indication of relatively larger particles capable of removal in the filter system by the first bodyfed filter aid and the second condition is color of the filter outlet fluid as an indication of relatively smaller particles or "color bodies" capable of removal by the second bodyfed filter aid supplied to the filter system.

40. Apparatus constructed and arranged for optimizing operation of a filter system receiving fluid to be filtered from a supply means and supplying filtered fluid to a process system characterized by varying demands for filtered fluid, the apparatus comprising:

control means for controlling operation of the supply means and for supplying outlet filtered fluid to the process system at a rate generally proportional to the varying demands for filtered fluid by the process system;

means for sensing a selected parameter of the process system indicative of its varying demands for filtered fluid;

means responsive to the sensing means for generating feedback data representative of the selected parameter, the control means responsive to the generated feedback data for causing the supply means to supply inlet fluid to the filter system and to produce filtered outlet fluid at a rate of flow determined by the feedback data, whereby the filter system is caused to operate at a variable flow rate for supplying filtered fluid to the process system generally in proportion to the varying demands for filtered fluid by the process system to optimize operation of the filter system;

a first bodyfed filter aid supplied from a first bodyfeed source to a filter element in the filter system;

first means for monitoring at least one first condition selected from the group consisting of (a) a condition of inlet fluid supplied to the filter system, (b) a condition of outlet filtered fluid supplied to the process system, and (c) a condition of the filter element;

first means for regulating operation of the first bodyfeed source in response to the first monitoring means in order to supply the first bodyfed filter aid to the filter system in an amount and at times indicated by the first monitored condition;

a second bodyfed filter aid supplied from a second bodyfeed source to a filter element in the filter system;

second means for monitoring at least one second condition selected from the group consisting of (a) a condition of the inlet fluid to the filter system, (b) a condition of the outlet filtered fluid supplied to the process system, and (c) a condition of the filter element; and second means for regulating operation of the second bodyfeed source in response to the second monitored condition for regulating the supply of the second bodyfed filter aid to the filter element at times and in amounts determined by the second condition.

41. The apparatus of claim 40 wherein the first monitoring means monitors turbidity or contaminant particle count of the filter inlet fluid as an indication of relatively larger particles capable of removal in the filter system by a first bodyfeed and the second monitoring means monitors fluid color as an indication of relatively smaller particles or polar "color bodies" capable of removal by the second bodyfed filter aid supplied to the filter system, the first bodyfed filter aid being a porous/depth type filter aid material and the second bodyfed filter aid being a polar or charged clay.

42. The apparatus of claim 41 wherein the second regulating means is adapted for always supplying depth type filter aid material in combination with the polar or charged clay material.

43. Apparatus constructed and arranged for optimizing operation of a filter system receiving coolant/lubricant to be filtered from a supply means and supplying filtered coolant/lubricant to a process system, the apparatus comprising:

- variable control means for controlling operation of the supply means and for supplying outlet filtered coolant/lubricant to the process system at a rate of flow generally proportional to the varying demands for filtered coolant/lubricant by the process system;
- means for sensing a selected parameter of the process system indicative of its varying demands for filtered coolant/lubricant;
- means responsive to the sensing means for generating feedback data representative of the selected parameter, the control means responsive to the generated feedback data for causing the supply means to supply inlet coolant/lubricant to the filter system and to produce filtered outlet coolant/lubricant at a rate of flow determined by the feedback data, whereby the filter system is caused to operate at a variable rate of flow for supplying filtered coolant/lubricant to the process system generally in proportion to the varying demands for filtered coolant/lubricant by the process system to optimize operation of the filter system;
- means for supplying bodyfed filter aid material from bodyfeed means to a filter element in the filter system;
- means for monitoring at least one variable condition selected from the group consisting of (a) turbidity of inlet coolant/lubricant supplied to the filter system, (b) color of outlet filtered coolant/lubricant supplied to the process system, and (c) a condition of the filter element; and
- means for regulating operation of the bodyfeed means in response to the monitoring means in order to supply the bodyfed filter aid material to the filter system in an amount and at times indicated by the monitored condition.

44. The apparatus of claim 43 wherein the bodyfed filter aid material comprises a porous and/or depth filtering type filter aid material and the bodyfeed means comprises a bodyfeed source for supplying the filter aid material to the filter system in an amount and at times indicated by the monitored condition for removing relatively larger particles from the coolant/lubricant to supply the process system with filtered coolant/lubricant.

45. The apparatus of claim 43 wherein the bodyfed filter aid material comprises a polar or charged clay type filter aid material and the bodyfeed means comprises a bodyfeed source for supplying the filter aid material to the filter system in an amount and at times indicated by the monitored condition for removing relatively smaller particles or polar "color bodies" from the coolant/lubricant to supply the process system with filtered coolant/lubricant.

46. The apparatus of claim 43 wherein bodyfeed means comprises a first bodyfeed source for supplying a first bodyfed filter aid material that comprises a porous/depth filtering type filter aid material for removing relatively larger particles from the coolant/lubricant, the regulating means regulating operation of the first bodyfeed source in response to the monitoring means in order to supply the first bodyfed filter aid material to the filter system in an amount and at times indicated by a first one of the monitored conditions, and a second bodyfeed source for supplying a second filter aid material for removing relatively smaller particles or polar "color bodies" from the coolant/lubricant, the regulating means regulating operation of the second bodyfeed source in response to the monitoring means in order to supply the second bodyfed filter aid material to the filter system in an amount and at times indicated by a second one of the monitored conditions.

47. A method for optimizing operation of a filter system supplying outlet filtered fluid to a processing system, comprising the steps of:

- supplying at least a first and a second bodyfed filter aid from at least a first and a second bodyfeed source respectively to the filter system;
- monitoring at least a first variable condition selected from the group consisting of (a) a condition of the inlet fluid to the filter system, (b) a condition of outlet filtered fluid supplied to the process system, and (c) a condition of a filter element of the filter system;
- regulating operation of the first bodyfeed source in response to the first monitored condition in order to supply the first bodyfed filter aid to the filter system in an amount and at times indicated by the first monitored condition of the filter fluid;
- monitoring at least a second variable condition selected from the group consisting of (a) a condition of the inlet fluid to the filter system, (b) a condition of the outlet filtered fluid supplied to the process system, and (c) a condition of the filter element; and
- regulating operation of the second bodyfeed source in response to the second monitored condition in order to supply the second bodyfed filter aid to the filter system in an amount and at times indicated by the second monitored condition.

48. Apparatus for optimizing operation of a filter system supplying filtered fluid to a processing system, the apparatus comprising:

- first and second bodyfeed sources for respectively supplying either a first or a second bodyfed filter aid to the filter system;
- first means for monitoring at least one variable selected from the group consisting of (a) a condition of the inlet fluid to the filter system, (b) a condition of outlet filtered fluid supplied to the process system, and (c) a condition of a filter element of the filter system;
- first means for regulating operation of the first bodyfeed source in response to the first monitoring means in order to supply the first bodyfed filter aid to the filter system in an amount and at times indicated by the first monitored condition;
- second means for monitoring at least one variable selected from the group consisting of (a) a condition of the inlet fluid to the filter system, (b) a condition of the outlet filtered fluid supplied to the process system, and (c) a condition of the filter element; and
- second means for regulating operation of the second bodyfeed source in response to the second monitored condition in order to supply the second bodyfed filter aid to the filter system in an amount and at times indicated by the second monitored condition.

* * * * *